April 18, 1967     A. S. VOLPIN     3,314,442
AUTOMATIC SEALANT-SEALED VALVE
Filed April 27, 1964     2 Sheets-Sheet 2
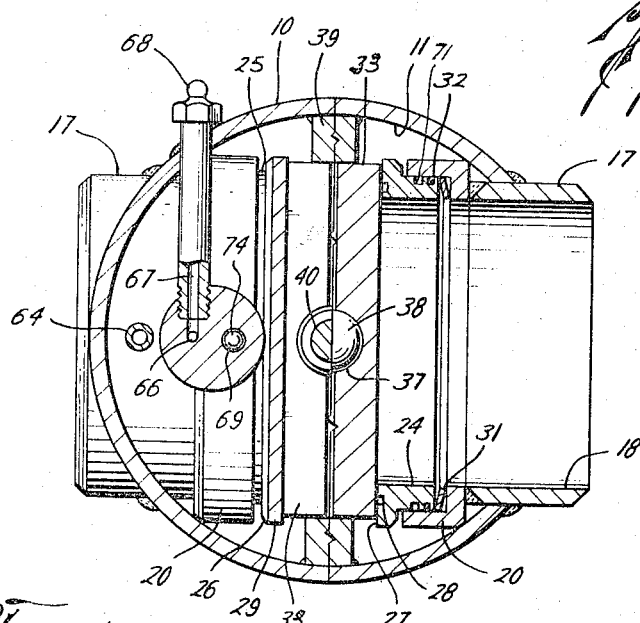
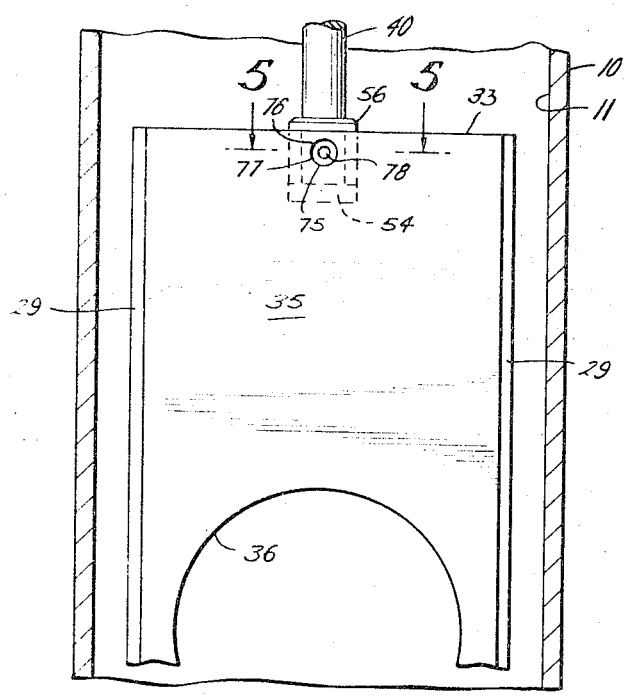
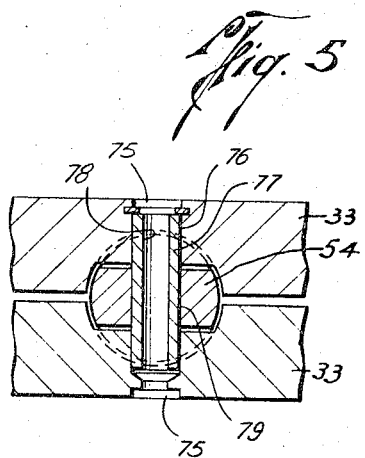
Alexander S. Volpin
INVENTOR.
BY
ATTORNEY

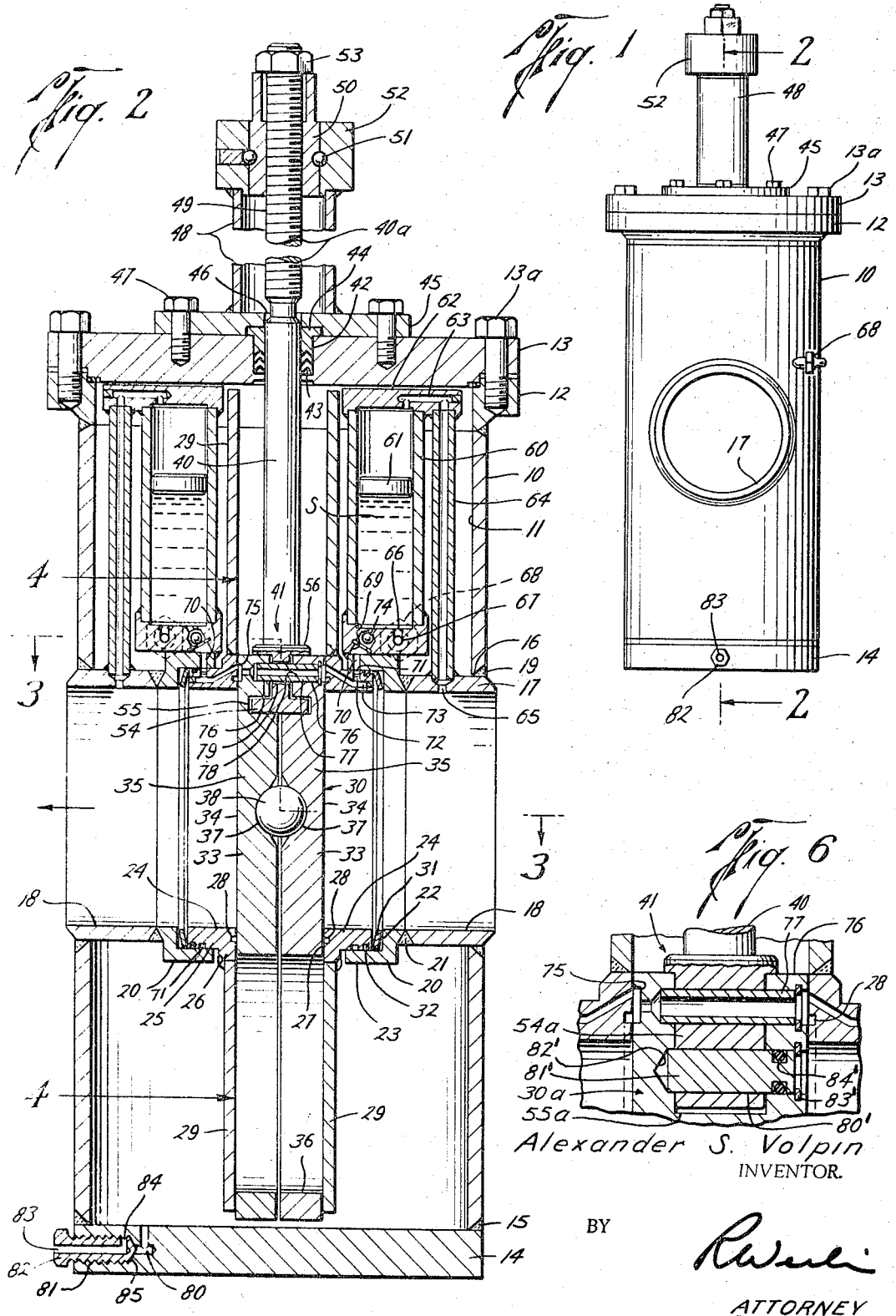

3,314,442
AUTOMATIC SEALANT-SEALED VALVE
Alexander S. Volpin, 10200 W. Broadview Drive, Miami Beach, Fla. 33139
Filed Apr. 27, 1964, Ser. No. 362,802
15 Claims. (Cl. 137—246.12)

This invention relates to valves of the automatic-sealing type employing a flowable sealant, such as lubricant or other plastic-type material for sealing between the closure and seat elements of the valve. More particularly, the present invention relates to automatic sealant-sealed gate valves of the through-conduit type.

Valves of the through-conduit type are now commonly employed for controlling very large diameter pipe lines, such as oil and gas lines, and necessarily constitute very large, massive structures designed to control large volume fluid flows under substantial pressures. In order to reduce the very great mass of such valve structures, the difficulty of machining the parts thereof, and the cost, the current trend is to manufacture such large valves by fabrication from steel plates and tubes, which may be shaped and welded by relatively simple and cheap procedures to form the elements of the valve.

One of the disadvantages of employing fabricated valves, particularly in large sizes, is that the relatively light or thin metal sections constituting many of the valve parts are subject to some degrees of distortion under the fluid pressures and other stresses encountered in operation and they are, therefore, subject to leakage and other difficulties arising from such distortions.

Accordingly, the present invention has among its primary objects, the provision of an automatic sealing arrangement by which both the upstream and downstream sides of the valve may be simultaneously sealed with a flowable sealant in response to pressure differentials across the valve. By such simultaneous dual sealing, one of the difficulties experienced with more conventional valve designs, particularly of the fabricated type, is overcome.

A further important object of this invention is the provision, in an automatic sealant-sealed valve of the general character mentioned, of a closure construction of the segmented gate-type which employs novel means permitting angular adjustment of the gate segments in order that the sealing faces of the gate segments will be enabled to conform to deviations in the gate seats produced as a result of pressure and temperature distortions or construction inaccuracies.

Other and more specific objects and advantages of this invention will become more readily apparent from the following detailed description when read in conjunction with the accompanying drawing which illustrates useful embodiments in accordance with this invention.

In the drawing:

FIG. 1 is an elevational view of one form of valve in accordance with this invention;

FIG. 2 is a vertical sectional view taken generally along line 2—2 of FIG. 1;

FIG. 3 is a transverse sectional view taken generally along line 3—3 of FIG. 2;

FIG. 4 is a fragmentary, partly sectional, partly elevational view taken generally along line 4—4 of FIG. 2;

FIG. 5 is a fragmentary sectional view taken along line 5—5 of FIG. 4; and

FIG. 6 is a fragmentary sectional view illustrating a modification of a portion of the valve structure.

Referring to the drawing, FIG. 1 illustrates an elevational view of a valve of the fabricated type constructed in accordance with this invention. As seen, the valve comprises a generally tubular body 10 which may be constructed of ordinary pipe of the requisite diameter for the particular size valve desired, the bore of body 10 defining a valve chamber 11 (FIG. 2). At its upper end body 10 is provided with an annular bonnet flange 12 adapted to receive a matching plate-type bonnet 13 for closing the upper end of valve chamber 11. The connection between bonnet 13 and flange 12 may be made by the usual stud bolts or cap screws 13a. At its lower end body 10 is provided with a closure plate 14 which may be secured to the body as by welding 15 and forms a closure for the lower end of valve chamber 11. Intermediate its ends body 10 is provided at diametrically opposite points with registering circular openings 16—16 adapted to receive short tubular nipples 17—17 defining flow ports 18—18. Nipples 17 may be secured to the walls of body 10 in openings 16 as by means of welding 19. It will be understood that either one of the flow ports 18 may be the upstream flow port and the other the downstream flow port. At its inner end each of the nipples 17 is secured coaxially to an annular seat receptacle 20 as by the welding 21. The seat receptacle includes an annular bottom wall 22 and an annular peripheral flange 23 extending inwardly of valve chamber 11, the seat receptacles secured to the respective nipples facing inwardly toward each other. Mounted for axial sliding movement in each of the seat receptacles is an annular seat member 24 comprising a cylindrical shank 25 and an enlarged head 26, the outer end face of which defines a closure-engaging sealing face 27 which is provided intermediate its inner and outer peripheries with an annular sealing groove 28. The periphery of head portion 26 of each of the seat members is fixedly secured to vertically extending guide plates 29, the inner faces of which are parallel and flush with end faces 27 of the respective seat members. Guide plates 29 terminate at their lower ends a short distance above bottom closure plate 14 and are also spaced slightly from bonnet 13. Guide plates 29 serve to guide a closure member, designated generally by the numeral 30, in its reciprocatory movements between the seat members. Annular springs 31 are positioned in the seat receptacles in compression between bottom walls 22 thereof and the inner ends of shanks 25 of the seat members to bias the seat members outwardly of the receptacles and toward the opposed faces of closure member 30. An annular seal packing 32 is arranged between shank 25 and the inner wall of flange 30 of the seat receptacle to provide a fluid-tight slidable seal between these elements.

Closure member 30 in the embodiment illustrated in FIGS. 1 to 5, is a gate-type closure of generally flat, generally rectangular configuration and comprising parallel segments 33—33 having substantially flat outer sealing faces 34—34. The upper portions of the gate segments are made solid and define flow-way-closing portions 35—35, and the lower portions of the gate segments are intersected by coaxial circular openings 36—36 adapted to register co-axially with the flowway through the valve when the closure member is in its uppermost position, closure portions 35—35 being dimensioned and disposed to intersect and close-off the flowway when the closure member is in its lowermost position, as seen in FIG. 2. Closure portions 35 are provided at about the mid-point of their opposed inner faces with generally semi-spherical sockets or recesses 37—37 adapted to receive a ball-shaped bearing member 38 which is arranged to hold the gate segments in slightly spaced relation while permitting a limited degree of relatively angular movement between the gate segment. Vertically extending ribs 39 are mounted on opposite sides of chamber 11 to function as guide rails engaging the side edges of closure member 30, and in cooperation with guide plates 29 accurately guide the closure member in its reciprocatory movements.

A stem member 40 is operably connected to closure member 30 by a connection means, designated generally by the numeral 41, the details of which will be described hereinafter. Stem member 40 extends upwardly through a stuffing box 42 in bonnet 13, the stuffing box having packing 43 disposed therein about the stem member under compression of a gland 44. A cap 45 has a central opening 46 therein to receive the upper end of stem member 40 and is attachable to the upper face of bonnet 13 by means of bolts 47, serving also to apply pressure to gland 44 for compressing the stuffing box packing. A tubular housing 48 is mounted on top of cap 45 concentrically surrounding the upper end portion 40a of stem member 40, the latter portion of the stem member being provided with external threads 49. A drive nut 50 is mounted on threaded portion 49 and is supported in anti-friction bearings 51 mounted in a cap 52 carried on the upper end of housing 48. The upper end of nut 50 is provided with flats for reception of an operator of any suitable form by which rotation of drive nut 50 may be effected for reciprocating stem member 40. A lock nut 53 is mounted on the upper end of the stem member to engage the drive mechanism to limit downward movement of the closure member.

Connector means 41 includes an inverted, generally T-shaped head 54 carried by the lower end of stem member 40 and adapted to be received in a correspondingly shaped slot 55 extending laterally equally into closure segments 33 from the inner faces thereof and transversely of the segments from side edge to side edge thereof. Stem member 40 carries an annular flange 56 which is vertically spaced from T-head 54 at a distance such that it will ride on the upper ends of the closure segments when T-head 54 is in place in T-slot 55.

Each side of the valve is provided with a separate automatic sealant-sealing system. As both systems are identical, the following description will be limited to one of the systems, it being understood that this description is applicable to both.

The sealing system comprises a generally tubular reservoir 60 disposed in chamber 11 between guide plate 29 and the wall of the chamber. The reservoir is provided with a slidable piston or barrier 61, such as is conventionally employed in automatic sealing systems of the kind herein contemplated. The upper end of reservoir 60 above the barrier, is closed by means of a cap 62 having a passage 63 therein which communicates at one end with the interior of reservoir 60 above barrier 61 and at the other end with a conduit 64, the lower end of which communicates with a port 65 opening through the wall of nipple 17 into communication with flow port 18. The lower portion of reservoir 60 below barrier 61 is in communication through a port 66 with a conduit 67 leading to the exterior of body 10 and connected exteriorly of the latter with a conventional pressure-type sealant fitting 68 (see FIG. 3), through which a flowable sealant S may be introduced into reservoir 60 beneath barrier 61. A discharge passageway 69 leads through the bottom wall of reservoir 60 into communication with a passage 70 extending radially through flange 23 of the seat receptacle. Passage 70, in turn, registers with an annular groove 71 which encircles shank 25 of seat member 24 and a short passage 72 connects groove 71 with a passage 73 which extends generally longitudinally of seat member 24 and opens to end face 27 at a point between groove 28 and the outer periphery of head 26 of the seat member. An outwardly opening check valve 74 of any suitable and generally conventional construction, is mounted in discharge passage 69 and is arranged to permit discharge of sealant S from reservoir 60, while preventing back-flow of fluid into the reservoir. By locating check valve 74 in passage 69, the check valve will be continuously bathed in sealant, which is of a character such that the check valve will be protected against being cut out or otherwise becoming inoperative in the sealing system.

Sealing faces 34 of the closure segments are provided near their upper ends with short jumper recesses 75 which may be circular and having a diameter such that when the closure member is in the lowermost of flowway-closing position, seen in FIG. 2, each recess will provide communication between the end of the related passage 73 and sealing groove 28, so that in this position sealant from reservoir 60 may flow through the several inter-connecting passages into groove 28 on the related side of the closure member.

Each of the closure segments 33 is provided at points generally co-axial with jumper recesses 75 with registering openings 76 which communicate with the related jumper recesses 75. The inner portions of recesses 75 are enlarged in diameter through a portion of their length to receive a tubular sleeve 77 which spans the space between the closure segments and is constructed of a flexible material which will preferably be a plastic or rubber-like composition, but may be of a metallic character adapted to flex or bend in some degree, as may be required for purposes to be described hereinafter. Sleeve 77 has an axial bore 78, the ends of which are in communication with jumper recesses 75 through the outer end portions of openings 76. T-head 54 is provided with a transverse opening 79 to permit installation of sleeve 77 across the space between the closure segments.

To bleed out fluid which may be trapped under pressure in chamber 11 of the valve when the latter is in closed position, there is provided in bottom closure plate 14 a vent passage 80 which communicates with a threaded socket 81 in which is mounted a screw plug 82 having an axial passage 83 therein communicating with a side pasasge 84 which leads to the exterior of plug 82. The bottom 84 of socket 81 forms a seat for the inner end of plug 82 which, when engaged with the seat, will close-off vent passage 80. When plug 82 is unscrewed by a few turns, side passage 84 will be placed into communication with the bottom of socket 81 and thence with passage 80, allowing pressure fluid to be vented through passages 80, 84, and 83 to the exterior of the valve.

In operation, as noted previously, either side of the valve may be the upstream and the other the downstream side, the substantially identical construction of both sides of the valve permitting installation of the valve in a pipe line with either end being the upstream end.

For purposes of this description, the direction of flow of fluid through the valve is indicated by the arrows in FIG. 2, the right-hand side being the upstream side and the left-hand side being the downstream side.

When the closure member has been moved downwardly to attain the flowway-closed position, shown in FIG. 2, a differential in pressure will be established across the valve. The upstream pressure will then be exerted through the upstream port 65, conduit 64, and passage 63 into the upper portion of the upstream reservoir 60 above barrier 61, forcing the latter downwardly and causing sealant S to be forced outwardly through discharge passages 69 and 70 into annular groove 71 and through passage 72 into passage 73. As the closure member is in flowway-closing position, shown in FIG. 2, jumper recesses 75 will have been moved into position establishing communication between passage 73 and upstream sealing groove 28. Sealant will then be forced into the latter providing the desired plastic sealing between the end face of the seat member and opposed sealing face of the closure portion 35 of the closure segment. At the same time, the sealant entering jumper recess 75 on the upstream side of the valve will be forced through bore 78 of sleeve 77 and thence via jumper recess 75 on the downstream side of the valve into sealing recess 28 in the downstream seat member. This sealant will be blocked from going into the downstream reservoir by the downstream check valve 74.

By the arrangement described, it will be seen that both the upstream and downstream sides of the closure will be subjected substantially simultaneously to automatic sealant sealing from the upstream reservoir. At the same time, both seat members will be urged toward the opposed sealing faces of the related closure segments by the springs 31 and on the upstream side this pressure will be supplemented by the force of the upstream fluid pressure, which will also be exerted against the downstream seat. Upstream pressure will move the closure member bodily against the downstream seat which will serve to hold the downstream seat in close engagement with the sealing face of the downstream closure segment, thereby assuring the sealing efficiency of the sealant discharged into the downstream sealing groove 28.

Bearing member 38 provides a pivot means by which a limited amount of relative angular movement may occur between the closure segments, which will allow the upstream gate segment to accommodate itself to sealing face 27 of the upstream seat member in order to conform to any slight distortions or construction inaccuracies in these elements. For this purpose the relative dimensions of T-head 54 and T-slot 55 are made such as to provide a small amount of clearance sufficient to accommodate the angular movements of the closure segments. Also, by making sleeve 77 of flexible material, the sleeve member may bend or flex sufficiently so that this angular movement will not be hindered.

FIG. 6 is a fragmentary sectional view illustrating a modification of connection means 41 to provide passage means for simultaneous sealing of both sides of the closure member when the latter is a solid or one-piece body, rather than a segmented member. In this modification, the gate member is designated generally by the numeral 30a. Instead of the integral T-shaped head 54 of the previous embodiment, the connection means includes the cylindrical shank 54a receivable in a correspondingly shaped socket 55a. Shank 54a is provided near its lower end with a transverse opening 80' adapted to receive a locking pin 81' inserted through a registering opening 82' in the gate member. Opening 82' is closed at its inner end and a snap ring 83' is arranged in its outer end to retain locking pin 81' in place. A packing ring 84' is arranged between the outer end portion of pin 81' and opening 82' to seal against the loss of sealant. In all other respects the connection elements are of the same form as those illustrated in the previous embodiments, and the valve elements on the whole are the same and operate in the same manner as in the principal embodiment, except that it will be evident that in the absence of the segmented form of closure member, the adjustment of the individual closure segments to the seats will not occur. However, it will be recognized that there may be many types of valve constructions in which this type of adjustment will not be found necessary. In any event, as noted, both modifications provide the means for effecting substantially simultaneous automatic sealing of both sides of the valve in response to pressure differentials across the valve.

It will be understood that various alternations and modifications may be made in the details of the illustrative embodiments within the scope of the appended claims out without departing from the spirit of this invention.

What I claim and desire to secure by Letters Patent is:

1. In an automatic sealant-sealed valve, a housing having a closure chamber therein, an operable closure in the chamber having upstream and downstream sealing faces, aligned flow ports opening into said chamber, seat members slidably mounted in the inner ends of said flow ports, means biasing the seat members toward said sealing faces, and a sealing system for said sealing faces including a sealant reservoir in the housing, a movable barrier therein, conduit means providing direct communication for upstream line pressure between the upstream flow port and the portion of said reservoir on one side of said barrier, and discharge passage means communicating the portion of said reservoir on the opposite side of said barrier with both said sealing faces, said sealing system being operable when said closure is in flow port-closing position to force sealant from said reservoir to both said sealing faces in response to pressure differentials between the upstream and downstream sides of the valve.

2. In a valve according to claim 1, wherein said discharge passage means includes a passage section extending transversely through the body of said closure member communicating with both said sealing faces.

3. In a valve according to claim 1, wherein said sealing system includes full port sealing grooves arranged about said flow ports between said seat members and said sealing faces to communicate with said discharge passage means when said closure attains said flow port-closing position.

4. In a valve according to claim 1, wherein said sealing system includes full port sealing grooves arranged about said flow ports in the inner end faces of said seat members, and wherein said discharge passage means includes a passage section extending transversely through the body of said closure, and jumper recesses disposed in said sealing faces to communicate the opposite ends of said transverse passage section with the related sealing grooves when said closure attains said flow port-closing position.

5. In a valve according to claim 1, outwardly opening check valve means mounted in said discharge passage means.

6. In a valve according to claim 1, wherein said closure is a one-piece gate-type body.

7. In a valve according to claim 1, wherein said closure comprises a generally flat gate-type body constituted by a pair of generally parallel segments of like shape.

8. In a valve according to claim 1, wherein said closure comprises a generally flat gate-type body constituted by a pair of generally parallel segments of like shape, and pivot means disposed between said segments to permit limited relative pivotal movement between said segments whereby to allow conforming adjustment of said sealing faces to the opposed end faces of said seat members.

9. In a valve according to claim 8, wherein said pivot means comprises a ball-shaped bearing element having bearing engagement with the opposed inner faces of said segments.

10. In a valve according to claim 8, stem means reciprocably mounted in said housing, and connector means operably connecting said stem means to both said segments, said connector means being constructed and arranged to accommodate said pivotal movement of said segments.

11. In an automatic sealant-sealed valve, a housing having a closure chamber therein, an operable closure in the chamber having upstream and downstream sealing faces, aligned flow ports opening said chamber, seat members slidably mounted in the inner ends of said flow ports, means biasing the seat members toward said sealing faces, and a sealing system for said sealing faces including a pair of sealant reservoirs in the housing, each reservoir having a movable barrier therein, each reservoir being connected to conduit means providing direct communication for line pressure between one of the flow ports and the portion of that reservoir on one side of said barrier, and discharge passage means communicating the portion of each said reservoir on the opposite side of said barrier with both said sealing faces, said sealing system being operable when said closure is in flow port-closing position to force sealant from one of said reservoirs to both said sealing faces in response to pressure differentials between the upstream and downstream sides of the valve.

12. In a valve according to claim 11, wherein said discharge passage means from both said reservoirs includes a common passage section extending transversely through the body of said closure communicating with both said sealing faces.

13. In a gate valve, a housing having a closure chamber therein, a gate-type closure in the chamber comprising a pair of flat generally parallel segments of like shape having sealing faces on their outer surfaces, aligned flow ports opening into said chamber, seat members slidably mounted in the inner ends of said flow ports and having closure-engaging end faces, means biasing the seat members toward said sealing faces, pivot means disposed between said segments to permit limited relative pivotal movement between said segments whereby to allow conforming adjustment of said sealing faces to the opposed end faces of said seat members, and means in said housing operable in response to pressure differentials between the upstream and downstream sides of said valve when said closure is in the flow port-closing position for automatically delivering sealant simultaneously to both said sealing faces.

14. In an automatic sealant-sealed valve, a housing having a closure chamber therein, an operable closure in the chamber having upstream and downstream sealing faces, upstream and downstream flowports opening into said chamber, seat sealing members mounted about said flowports, a sealing system for said sealing faces including a sealant reservoir interiorly of said chamber, means to inject sealant therein, means directing upstream line pressure into said reservoir, and sealant discharge passage means communicating said reservoir with said upstream and downstream sealing faces, said sealing system being operable when said closure is in flow-closing position whereby to simultaneously force sealant from said reservoir to both said upstream and downstream sealing faces in response to pressure differentials across said sealant reservoir between the upstream and downstream sides of the valve.

15. In an automatic sealant-sealed valve, a housing having a closure chamber therein, an operable closure in the chamber having upstream and downstream sealing faces, upstream and downstream flowports opening into said chamber, a pair of seat members mounted about said flowports each having a sealing surface cooperating with said sealing faces of the closure, a peripheral sealant groove disposed about the sealing surface of each said seat member, sealant conduit means connecting said seats and grooves, a sealing system for said sealing grooves and faces including a sealant reservoir interiorly of said chamber, means to inject sealant therein, means directing upstream line pressure into said reservoir, and sealant discharge passage means communicating said reservoir with said upstream and downstream sealing faces, said sealing system being operable when said closure is in flow-closing position whereby to simultaneously force sealant from said reservoir to both said upstream and downstream sealing faces in response to pressure differentials across said sealant reservoir between the upstream and downstream sides of the valve.

References Cited by the Examiner

UNITED STATES PATENTS

| 2,776,813 | 1/1957 | Blackman | 251—197 |
| 2,956,580 | 10/1960 | Heath | 137—246.12 |
| 3,095,004 | 6/1963 | Jackson | 137—246.12 X |
| 3,135,285 | 6/1964 | Volpin | 137—246.12 |

FOREIGN PATENTS

| 867,647 | 5/1961 | Great Britain. |
| 367,020 | 3/1963 | Switzerland. |

CLARENCE R. GORDON, *Primary Examiner.*